United States Patent [19]

Ikeda et al.

[11] Patent Number: 5,455,296
[45] Date of Patent: Oct. 3, 1995

[54] RUBBER MEMBER FOR PAPER-FEEDING MACHINE PARTS

[75] Inventors: Masahiro Ikeda; Tsukasa Tanaka, both of Saitama, Japan

[73] Assignee: Shin-Etsu Polymer Co., Ltd., Tokyo, Japan

[21] Appl. No.: 240,262

[22] Filed: May 10, 1994

Related U.S. Application Data

[63] Continuation-in-part of Ser. No. 964,005, Oct. 20, 1992, abandoned.

[30] Foreign Application Priority Data

Oct. 28, 1991 [JP] Japan ................................. 3-308415

[51] Int. Cl.$^6$ ....................................... B32B 25/20
[52] U.S. Cl. ........................ 524/588; 428/447; 528/24
[58] Field of Search ............................. 428/447; 528/24; 524/588, 315, 261, 267

[56] References Cited

FOREIGN PATENT DOCUMENTS 176348  10/1984  Japan ............................... C08L 83/04

*Primary Examiner*—Paul J. Thibodeau
*Assistant Examiner*—David Abraham

[57] ABSTRACT

Disclosed is a rubber member for paper-feeding machine parts, such as rubber rollers, rubber belts and the like in copying machines and printers of computers, word processors, facsimile machines and the like, capable of exhibiting excellent smoothness and stability of paper transfer performance. The rubber member is a cured silicone rubber body obtained by curing a specific silicone rubber composition containing a silicone-based tackifier and a cured silicone rubber powder and is characterized by the specific values of the tear strength, ultimate elongation and rubber hardness.

5 Claims, No Drawings

RUBBER MEMBER FOR PAPER-FEEDING MACHINE PARTS

This application is a continuation-in-part of application Ser. No. 07/964,005 filed Oct. 20, 1992, now abandoned.

BACKGROUND OF THE INVENTION

The present invention relates to a rubber member for paper-feeding machine parts as in copying machines, printers of computers, word processors and facsimile machines and the like. More particularly, the invention relates to a rubber member such as rubber rollers, rubber belts and the like used as a part of paper-feeding machines capable of very smoothly transferring paper sheets with an outstandingly high coefficient of friction against paper and excellent stability against variation in the ambient conditions and in the lapse of time.

The above mentioned machines for office automation each must have a mechanism for feeding and transfer of paper sheets which always includes a rubber member such as rubber rollers, rubber belts and the like coming into frictional contact with the paper sheet. It is readily understood that, in order to ensure good smoothness of feeding and transfer of paper sheets, the surface of the rubber member must have a high coefficient of friction with the paper sheet. In this regard, the rubbery material of the rubber member for paper-feeding machine parts is limited to several types of rubbers including so-called EPDM rubbers, i.e. copolymeric rubbers of ethylene, propylene and a diene monomer, polychloroprene rubbers, polynorbornene rubbers and the like among synthetic rubbers. Spongy or foamed bodies of these rubbers can also be used for the purpose though, naturally, with some decrease in the mechanical strength.

These known rubbers, however, are not always quite satisfactory as a material of a rubber member for paper-feeding machine parts in respect of their relatively poor performance under adverse ambient conditions. The rubbers heretofore used in such an application usually have a relatively low hardness of 15° to 40° Hs as determined according to JIS K 6301 in the scale A because a low hardness of the rubber is a favorable condition for smoothness of paper feeding by exhibiting a large deformation or so-called nip amount under a specified pressing load. Such a low hardness of a rubber article can be obtained only by compounding the rubber composition with a large amount of plasticizers or softening agents unavoidably to cause various troubles such as bleeding of the plasticizer or softening agent on the surface, decrease in the mechanical properties and weatherability, instability of the coefficient of friction in the lapse of time and so on. In the rubber rollers for automatic paper feeder in facsimile machines, in particular, the paper for printing is usually impregnated or treated with a silicone oil which necessarily migrates toward the surface of the rubber roller and is accumulated there resulting in gradual decrease of the coefficient of friction eventually not to ensure smoothness of paper transfer.

Alternatively, a proposal has been made for the use of a silicone rubber as a material of a rubber member for paper-feeding machine parts. Silicone rubbers are generally stable against adverse ambient conditions and have a capacity to absorb silicone oils without accumulation in the surface layer so that the above mentioned problems can be at least partly solved. Unfortunately, however, conventional silicone rubbers in general have a relatively low coefficient of friction not to ensure smoothness and stability of paper transfer and are subject to the changes of the surface condition by abrasive wearing in contact with paper sheets to cause a decrease in the performance for paper transfer.

SUMMARY OF THE INVENTION

The present invention accordingly has an object to provide a novel rubber member for paper feeding machine parts such as rubber rollers, rubber belts and the like without the above described disadvantages and problems in the prior art rubber members for such an application.

Thus, the rubber member for paper-feeding machine parts as proposed by the invention is a cured rubber body having an ultimate elongation in the range from 10 to 600%, a tear strength in the range from 1 to 15 kgf/cm and a rubber hardness in the range from 15° to 40° Hs obtained by curing a silicone rubber composition which comprises, as a uniform blend:

(a) 100 parts by weight of a diorganopolysiloxane containing vinyl groups bonded to the silicon atoms and having a consistency of a gum;
(b) from 5 to 40 parts by weight of a fumed silica filler;
(c) a dispersing agent;
(d) a non-acyl organic peroxide as a curing agent;
(e) from 5 to 10 parts by weight of a silicone-based tackifier; and
(f) from 5 to 100 parts by weight of a powder of a cured silicone rubber having an average particle diameter in the range from 1 to 500 μm.

DETAILED DESCRIPTION OF THE PREFERRED EMBODIMENTS

As is described above, the rubber member of the invention is characterized by the specific values of the ultimate elongation, tear strength and rubber hardness as well as by the specific formulation of the silicone rubber composition which by curing gives the rubber member.

The diorganopolysiloxane containing silicon-bonded vinyl groups as the component (a) of the silicone rubber composition is a well known material in the art of silicone products and the molecular structure thereof is represented by the general formula

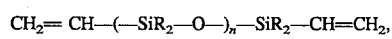

$$CH_2=CH-(-SiR_2-O-)_n-SiR_2-CH=CH_2,$$

in which R is a monovalent hydrocarbon group selected from the class consisting of methyl, ethyl, vinyl and phenyl groups and the subscript n is a positive integer in the range from 100 to 10,000. The diorganopolysiloxane should have a gum-like consistency in order that the cured rubber of the composition may have good mechanical properties. It is preferable that from 0.05 to 3% by moles of the organic groups in the molecules thereof are vinyl groups, the remainder being all or mostly methyl groups.

The component (b) in the silicone rubber composition is a fumed silica filler which is a reinforcing agent to impart the cured silicone rubber with good mechanical properties. The amount thereof in the composition is in the range from 5 to 40 parts by weight per 100 parts by weight of the component (a). When the amount thereof is too small, the cured silicone rubber cannot be imparted with good mechanical strengths while, when the amount thereof is too large, the coefficient of friction of the cured silicone rubber would be disadvantageously decreased though with improvements in some of the mechanical properties.

The component (c) in the silicone rubber composition is a dispersing agent which promotes dispersion of the silica filler in the matrix of the rubber composition. Suitable dispersing agents include silicone resins, alkoxy and hydroxy silanes and polysiloxanes, esters of an organic acid, diphenylsilane diol and the like. The amount of the dispersing agent in the silicone rubber composition is in the range from 0.1 to 25 parts by weight or, preferably, from 0.5 to 15 parts by weight per 100 parts by weight of the component (a).

The component (d) in the silicone rubber composition is an organic peroxide which serves as a crosslinking agent of the diorganopolysiloxane as the component (a). Acyl peroxides such as benzoyl peroxide, 2,4-dichlorobenzoyl peroxide and the like are not preferred when the cured silicone rubber of the composition is to be used as a rubber member for paper-feeding machine parts. Suitable non-acyl organic peroxides include dicumyl peroxide, di-tert-butyl peroxide, 2,5-dimethyl-2,5-bis(tert-butylperoxy) hexane and the like though not particularly limitative thereto. The amount of the organic peroxide in the silicone rubber composition should be selected in accordance with the desired curing velocity of the composition and the desired mechanical properties of the cured silicone rubber. It is usually in the range from 0.3 to 2 parts by weight per 100 parts by weight of the diorganopolysiloxane as the component (a).

The component (e) is a silicone-based tackifier which serves to increase the friction between the paper feeding machine part and the paper sheet transferred therewith. Although a variety of tackifiers are known in the art of rubbers, those other than the silicone-based ones are not preferred because non-silicone tackifiers are poorly compatible with the organopolysiloxane as the component (a) eventually resulting in bleeding of the tackifier on the surface of the shaped rubber body not to ensure good stability of the friction with the paper sheet. The silicone-based tackifier should preferably have functional organic groups as the pendants so as to be crosslinkable with the non-acyl organic peroxide.

In a preferred embodiment, the silicone-based tackifier consists of a diorganopolysiloxane and a silicone resin.

The amount of the silicone-based tackifier is in the range from 5 to 10 parts by weight per 100 parts by weight of the component (a). When the amount thereof is too small, the desired improving effect on the frictional behavior of the rubber parts cannot be fully obtained while, when the amount thereof is too large, difficulties are caused in the process of rubber milling.

The component (f) is a powder of a cured silicone rubber having an average particle diameter in the range from 1 to 500 μm or, preferably, from 5 to 100 μm. This component is effective to sustainedly maintain the surface friction of the rubber parts at an appropriate level. Namely, it is unavoidable that the surface friction of a rubber-made part is subject to gradual decrease when the rubber part is repeatedly used for paper transfer. Although silicone rubber-made parts are more resistant against the adverse influences from the ambient atmosphere than other synthetic and natural rubbers, it is unavoidable that the surface is smoothed not only by smoothing as a consequence of rubbing but also by the deposition of paper powders on the surface. As is readily understood, the surface friction of a rubber part can be increased by roughening the surface but such a roughened surface is rapidly smoothed when the rubber part is repeatedly used for paper transfer resulting in a decrease of the friction. This disadvantage can be prevented by the admixture of the silicone rubber composition with the silicone rubber powder in an amount of from 5 to 100 parts by weight per 100 parts by weight of the component (a). When the surface layer of the silicone rubber parts contains particles of a cured silicone rubber, the silicone rubber particles make a successive appearance on the surface always to keep the roughness of the surface even when the surface layer is worn out. When the amount of the silicone rubber powder is too small, this desirable effect can be exhibited only insufficiently while, when the amount thereof is too large, a decrease is caused not only in the processability of the rubber composition but also in the mechanical properties of the cured silicone rubber.

The silicone rubber composition for shaping the rubber member for paper-feeding machine parts according to the invention can be prepared by uniformly blending the above described components (a) to (f) together with other optional additive ingredients in a suitable rubber processing machine such as pressurizable kneaders, Banbury mixers, mixing rollers, planetary mixers and the like. It is preferable that the organic peroxide as the component (d) is admixed with the mixture of the other ingredients immediately before molding and vulcanization of the rubber composition by using a mixing roller.

The silicone rubber composition prepared in the above described manner can be shaped into a cured rubber member for paper-feeding machine parts such as rubber rollers, rubber belts and the like by a suitable molding method under compression at an elevated temperature in a metal mold. The molding method is not particularly limitative including compression molding, transfer molding, injection molding and the like. If necessary, a core member such as the core mandrel of a rubber roller is set in the metal mold and the silicone rubber composition is shaped in the form of a rubber roller around the core mandrel so as to be integrally cured by heating. Alternatively, the rubber composition alone is molded and cured into a thick-walled tubular form into which the core mandrel is inserted and adhesively bonded thereto to complete a rubber roller. The thus formed rubber roller is usually ground on a cylindrical grinding machine to be imparted with accuracy of the cylindrical surface of the roller.

It is essential that the silicone rubber member obtained by curing the above defined silicone rubber composition has specific values of the ultimate elongation, tear strength and rubber hardness in order to ensure smoothness of paper transfer. Namely, the ultimate elongation of the cured rubber must be in the range from 10 to 600% or, preferably, from 300 to 600%, the tear strength must be in the range from 1 to 15 kgf/cm or, preferably, from 5 to 15 kgf/cm and the rubber hardness must be in the range from 15 to 40° Hs each as determined according to the procedure specified in JIS K 6301. These parameters can be controlled by adequately selecting the compounding amounts of the organic peroxide and the fumed silica filler.

When the ultimate elongation and/or the tear strength of the cured silicone rubber are too large, the cured rubber body would be poorly susceptible to surface grinding so that difficulties are encountered in obtaining a good uniform surface condition so as to cause a variation in the coefficient of friction, in particular, at the initial stage of use of the rubber member along with a trend empirically found that the surface condition is subject to relatively large changes in the lapse of time so that the paper-transfer performance cannot be stable enough. When the rubber hardness of the cured silicone rubber is too low, the abrasion resistance of the rubber member would be decreased due to the unduly low mechanical strengths thereof not to ensure stable performance of paper transfer while, when the hardness of the cured rubber is too high, no sufficient deformation of the rubber member under a specified pressing load can be obtained so as not to ensure smoothness of paper transfer.

In the following, more detailed description is given to illustrate the rubber member of the invention for paper-feeding machine parts.

EXAMPLE 1.

Six silicone rubber compositions A, B, C, D, E and F were prepared each by uniformly blending, on a mixing roller, 100 parts by weight of a dimethyl polysiloxane gum terminated at each molecular chain end with a dimethyl vinyl silyl group, of which the content of vinyl groups was 0.15% by moles based on the overall organic groups, a varied amount as indicated in Table 1 of a fumed silica filler and a dispersing agent followed by further admixture of each mixture with 0.8 part by weight of 2,5-dimethyl-2,5-bis(tert-butylperoxy) hexane.

The silicone rubber composition was sheeted into a sheet of 2.3 mm thickness which was put into a metal mold having a depth of 2 mm, in which the sheet of the rubber composition was cured by compression under a pressure of 200 kgf/cm$^2$ at 175° C. for 5 minutes into a cured silicone rubber sheet having a thickness of 2 mm. The cured rubber sheet was cut into test pieces of each 30 mm by 50 mm wide, of which measurements were undertaken for the coefficient of kinematic friction against a paper sheet as well as mechanical properties according to the procedures specified in JIS K 6301 to give the results shown in Table 1.

TABLE 1

| Composition | A | B | C | D | E | F |
| --- | --- | --- | --- | --- | --- | --- |
| Silica filler, parts by weight | 50 | 37 | 25 | 15 | 7 | 5 |
| Coefficient of friction | 1.50 | 1.75 | 1.90 | 2.10 | 2.25 | 2.30 |
| Tensile strength, kgf/cm$^2$ | 60 | 42 | 30 | 25 | 20 | 19 |
| Tear strength, kgf/cm | 15 | 13 | 11 | 11 | 10 | 8 |
| Ultimate elongation, % | 250 | 330 | 400 | 430 | 550 | 620 |
| Hardness, JIS A | 49 | 37 | 28 | 22 | 17 | 15 |
| Surface roughness R$_{max}$, μm | 32 | 30 | 38 | 45 | 59 | 98 |

EXAMPLE 2.

Six more silicone rubber compositions G, H, I, J, K and L were prepared in the same formulation as in the composition C in Example 1 except that the compositions were further admixed each with 5 or 10 parts by weight of a peroxide-curable silicone-based tackifier and 5, 50 or 100 parts by weight of a cured silicone rubber powder having an average particle diameter of 250 μm as is shown in Table 2 below, which also shows the physical properties of the cured rubber sheets prepared from these rubber compositions and tested in the same manner as in Example 1.

TABLE 2

| Composition | G | H | I | J | K | L |
| --- | --- | --- | --- | --- | --- | --- |
| Tackifier, parts by weight | 5 | 5 | 5 | 10 | 10 | 10 |
| Rubber powder, parts by weight | 5 | 50 | 100 | 5 | 50 | 100 |
| Coefficient of friction | 2.20 | 2.15 | 2.00 | 2.30 | 2.25 | 2.10 |
| Tensile strength, kgf/cm$^2$ | 25 | 18 | 9 | 25 | 17 | 8 |
| Tear strength, kgf/cm | 9 | 6 | 4 | 8 | 6 | 4 |
| Ultimate elongation, % | 350 | 210 | 100 | 340 | 220 | 110 |
| Hardness, JIS A | 30 | 35 | 40 | 29 | 34 | 39 |
| Surface roughness R$_{max}$, μm | 38 | 40 | 39 | 40 | 40 | 39 |

EXAMPLE 3.

A metal mold having a cylindrical cavity for rubber roller was filled with one of the silicone rubber compositions A to L prepared in Examples 1 and 2, which was compression-molded in the metal mold under a pressure of 200 kgf/cm$^2$ at 175° C. for 15 minutes into a tubular form of a cured silicone rubber having an inner diameter of 9.0 mm, outer diameter of 20.5 mm and length of 200 mm. This rubber tube was cut in a length of 40 mm and, after insertion of a stainless steel mandrel having a diameter of 10 mm and a length of 150 mm, the surface of the rubber tube at about the center position of the mandrel was ground on a cylindrical grinding machine to give a rubber roller having an overall outer diameter of exactly 20.0 mm.

The surface condition of the thus prepared six rubber rollers was visually inspected to find that the surfaces of the rollers prepared from the compositions B, C, D and E were very smooth and uniform while the surface of the roller from the composition A was somewhat poor in uniformity and the surface of the roller from the composition F was not uniform. Further, the surface roughness of these rubber rollers was measured to give the results shown in Tables 1 and 2.

Separately, these rubber rollers were mounted on a paper-feeder of a copying machine and subjected to a paper-feeding running test under the conditions including a copying speed of 60 copies per minute using A4-size paper sheets having a basis weight of 68 g/m$^2$, 485 rpm of the roller revolution and 500 mm/second of paper transfer velocity. The results were that more than 100,000 sheets of paper could be smoothly transferred by the rubber rollers prepared from the rubber compositions B to E and G to L while failure of smooth paper transfer took place somewhere between 30,000 and 50,000 sheets with the rubber roller prepared from the composition A and between 50,000 and 70,000 sheets with the rubber roller prepared from the composition F.

The same paper feeding test as above was undertaken by using paper sheets of a heavier basis weight of 90 g/m$^2$ to find that failure of smooth feeding took place somewhere between 30,000 and 50,000 sheets with the rollers prepared from the rubber compositions A and F and somewhere between 50,000 and 70,000 sheets.

What is claimed is:

1. A rubber member for paper-feeding machine parts which is a cured rubber body having an ultimate elongation in the range from 10 to 600%, a tear strength in the range from 1 to 15 kgf/cm and a rubber hardness in the range from 15° to 40° Hs obtained by curing a silicone rubber composition which comprises, as a uniform blend:
   (a) 100 parts by weight of a diorganopolysiloxane containing vinyl groups bonded to the silicon atoms and having a consistency of a gum;
   (b) from 5 to 40 parts by weight of a fumed silica filler;
   (c) a dispersing agent;
   (d) a non-acyl organic peroxide;
   (e) from 5 to 10 parts by weight of a silicone-based tackifier; and
   (f) from 5 to 100 parts by weight of a powder of a cured silicone rubber having an average particle diameter in the range from 1 to 500 μm.

2. The rubber member for paper-feeding machine parts as claimed in claim 1 in which the non-acyl organic peroxide is selected from the group consisting of dicumyl peroxide, di-tert-butyl peroxide and 2,5-dimethyl-2,5-bis(tert-butylperoxy) hexane.

3. The rubber member for paper-feeding machine parts as claimed in claim 1 in which the amount of the non-acyl organic peroxide is in the range from 0.3 to 2 parts by weight per 100 parts by weight of the component (a).

4. The rubber member for paper-feeding machine parts as claimed in claim 1 in which the silicone-based tackifier consists of a diorganopolysiloxane and a silicone resin.

5. A rubber roller for paper-feeding machine parts which consists of (A) a core mandrel, and (B) a layer of a cured rubber provided on and around the core mandrel, which cured rubber has an ultimate elongation in the range from 10 to 600%, a tear strength in the range from 1 to 15 kgf/cm and a rubber hardness in the range from 15° to 40° Hs and is obtained by curing a silicone rubber composition comprising, as a uniform blend:
   (a) 100 parts by weight of a diorganopolysiloxane containing vinyl groups bonded to the silicon atoms and having a consistency of a gum;
   (b) from 5 to 40 parts by weight of a fumed silica filler;
   (c) a dispersing agent;
   (d) a non-acyl organic peroxide;
   (e) from 5 to 10 parts by weight of a silicone-based tackifier; and
   (f) from 5 to 100 parts by weight of a powder of a cured silicone rubber having an average particle diameter in the range from 1 to 500 μm.

* * * * *